United States Patent
Fellmeth et al.

(10) Patent No.: US 9,586,565 B2
(45) Date of Patent: Mar. 7, 2017

(54) HYDRAULIC UNIT OF A VEHICLE BRAKE SYSTEM

(71) Applicant: Robert Bosch GmbH, Stuttgart (DE)

(72) Inventors: Reiner Fellmeth, Besigheim (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/016,285

(22) Filed: Sep. 3, 2013

(65) Prior Publication Data

US 2014/0062177 A1    Mar. 6, 2014

(30) Foreign Application Priority Data

Sep. 3, 2012  (DE) .................. 10 2012 215 573

(51) Int. Cl.
| | |
|---|---|
| *B60T 13/00* | (2006.01) |
| *B60T 13/16* | (2006.01) |
| *B60T 13/68* | (2006.01) |
| *B60T 17/02* | (2006.01) |
| *B60T 8/36* | (2006.01) |

(52) U.S. Cl.
CPC .............. *B60T 13/16* (2013.01); *B60T 8/368* (2013.01); *B60T 13/686* (2013.01); *B60T 17/02* (2013.01)

(58) Field of Classification Search
CPC ........ B60T 13/16; B60T 13/686; B60T 17/02; B60T 8/368
USPC ............... 303/6.01, 9.72, 10, 116.4, DIG. 10
See application file for complete search history.

(56) References Cited

U.S. PATENT DOCUMENTS

| | | | | |
|---|---|---|---|---|
| 5,213,482 A | * | 5/1993 | Reinartz et al. ............. | 417/273 |
| 5,228,289 A | * | 7/1993 | Norton ......................... | 60/486 |
| 5,375,919 A | * | 12/1994 | Furuhashi ................. | 303/119.1 |
| 5,653,876 A | * | 8/1997 | Funke ........................ | 210/198.2 |
| 5,711,582 A | * | 1/1998 | Koike ............................. | 303/11 |
| 5,979,998 A | * | 11/1999 | Kambe et al. ............. | 303/116.1 |
| 6,065,816 A | * | 5/2000 | Nakazawa ................ | 303/116.4 |
| 6,174,033 B1 | * | 1/2001 | Busch et al. .................... | 303/10 |
| 6,193,331 B1 | * | 2/2001 | Yonemura et al. ........... | 303/186 |
| 6,446,435 B1 | * | 9/2002 | Willmann et al. ............. | 60/533 |
| 7,185,956 B2 | * | 3/2007 | Reuter et al. ............. | 303/116.1 |
| 7,322,658 B2 | * | 1/2008 | Hinz et al. ................. | 303/119.3 |
| 2006/0284477 A1 | * | 12/2006 | Yang ............................... | 303/10 |
| 2007/0176484 A1 | * | 8/2007 | Reuter et al. .................... | 303/10 |
| 2008/0106142 A1 | * | 5/2008 | Nishino et al. ................. | 303/10 |
| 2008/0191549 A1 | * | 8/2008 | Giering et al. ............ | 303/116.4 |
| 2008/0284239 A1 | * | 11/2008 | Schaefer et al. ................ | 303/10 |
| 2010/0237689 A1 | * | 9/2010 | Nakazawa et al. ............. | 303/10 |
| 2011/0074206 A1 | * | 3/2011 | Hwang ....................... | 303/6.01 |
| 2011/0074208 A1 | * | 3/2011 | Song ............................... | 303/10 |
| 2013/0057052 A1 | * | 3/2013 | Kunz et al. ....................... | 303/3 |

FOREIGN PATENT DOCUMENTS

JP            02120111 A  *  5/1990    ........... B60G 17/015

* cited by examiner

*Primary Examiner* — Pamela Rodriguez
(74) *Attorney, Agent, or Firm* — Maginot, Moore & Beck LLP

(57) ABSTRACT

In a hydraulic unit of a vehicle brake system having a first pump element, which is assigned to a first brake circuit, and a second pump element, which is assigned to a second brake circuit, the second pump element has a different delivery from the first pump element.

8 Claims, 2 Drawing Sheets

HYDRAULIC UNIT OF A VEHICLE BRAKE SYSTEM

This application claims priority under 35 U.S.C. §119 to patent application no. DE 10 2012 215 573.2, filed on Sep. 3, 2012 in Germany, the disclosure of which is incorporated herein by reference in its entirety.

BACKGROUND

The disclosure relates to hydraulic unit of a vehicle brake system having a first pump element, which is assigned to a first brake circuit, and a second pump element, which is assigned to a second brake circuit. The disclosure further relates to the use of such a hydraulic unit in a vehicle brake system.

Hydraulic units are used in vehicle brake systems in order to be able to provide a regulated brake pressure in associated brake circuits. For regulating the brake pressure the hydraulic unit comprises, among other things, at least one pump element, the pump piston of which is displaceable in a pump cylinder. In the area where brake fluid flows into the pump cylinder, the pump piston is furthermore guided in a pump housing, in which an eccentric drive for the pump piston is also situated. The eccentric drive is achieved by means of a drive shaft driven by a pump motor.

Conventionally, multiple pump elements, which form a so-called multi-piston system, are arranged in the single hydraulic unit. As a rule these pump elements are arranged in bores of the hydraulic unit. The hydraulic unit is connected by means of associated brake fluid lines to a brake master cylinder, thereby forming a relatively rigid connection between the hydraulic unit and the brake master cylinder. Connected in this way, pressure pulses generated during pumping are transmitted to an associated brake pedal. Furthermore, the pulses are amplified by a splash wall that acts as a resonator and are transmitted to an associated vehicle interior. Noises and vibrations produced by this process are perceived as unwelcome phenomena.

SUMMARY

According to the disclosure a hydraulic unit of a vehicle brake system is created, having a first pump element, which is assigned to a first brake circuit, and a second pump element, which is assigned to a second brake circuit. In this case the second pump element has a different delivery from the first pump element.

The disclosure is based on the finding that in vehicle brake systems a first brake circuit is often of a different length and/or a different volume compared to another, second brake circuit. According to the disclosure account is taken of this and the delivery of the associated pump element can be matched to the respective brake circuit volume. Here the pump element having the higher delivery is assigned to the brake circuit having the greater volume and the pump element with the smaller delivery is assigned to the smaller brake circuit volume. Matched to the demand in this way, the pump elements in operation are able to deliver at least approximately equal or different volumes of brake fluid per unit time through the first and second brake circuits. Here both pump elements are advantageously driven at a specific speed by a common pump motor or motor via an eccentric shaft. The speed or motor speed necessary for operation is advantageously reduced compared to known vehicle brake systems. Conventionally, despite the different brake circuit volumes for each brake circuit, pump elements with the same delivery are used, the motor speed being matched to the greater brake circuit volume.

By contrast, the effect of the reduced motor speed according to the disclosure is to reduce vibrations, particularly those acting on the brake pedal, and also to reduce vibrations and noise acting on the vehicle as a whole. Additional damping elements are no longer needed. Moreover, a smaller and/or lighter motor having an associated control unit of correspondingly smaller and/or lighter design can be used to save both components and costs. Furthermore, less energy is needed to drive the motor.

Furthermore, a hydraulic unit is preferably created, in which the first pump element is assigned to a front-axle brake circuit as first brake circuit and the second pump element is assigned to a rear-axle brake circuit as second brake circuit. Here the second pump element has a smaller delivery than the first pump element. With this smaller delivery the second pump element is matched to the demand on the rear-axle brake circuit. The rear-axle brake circuit has a lower elasticity and hence a smaller brake circuit volume than the front-axle brake circuit. The first pump element with its greater delivery is matched to the front-axle brake circuit. This gives a pump outfit which is especially matched to the demand and which in a very short time is capable of achieving a reliable braking effect, especially when the volumetric demand is very high.

A hydraulic unit is furthermore advantageously created in which multiple first pump elements are provided, which have an equal first delivery, and/or in which multiple second pump elements are provided, which have an equal second delivery. With multiple pump elements per brake circuit, each having an equal delivery, brake fluid is delivered especially evenly in each brake circuit. The especially even delivery of such a multi-piston unit created in operation augments the improving effect of the solution according to the disclosure that has already been described. In particular, this creates a hydraulic unit having at least one multi-piston unit that is especially unsusceptible to vibration and noise.

Alternatively, a hydraulic unit is preferably created, in which multiple first pump elements are provided, which have different first deliveries, and/or in which multiple second pump elements are provided, which have different second deliveries. Multiple pump elements having different deliveries are provided in each brake circuit. An especially flexible configuration of the delivery, matched to the demand on each brake circuit, and hence of the hydraulic unit as a whole, is thereby advantageously feasible.

An especially preferred hydraulic unit is created in which the pump elements are arranged in series in an axial direction on a drive shaft unilaterally driven by means of a drive motor. Here the delivery of a pump element situated closer to the drive motor is greater than the delivery of a pump element further remote from the drive motor. Multiple pump elements having different deliveries are arranged with their delivery increasing in the direction of the drive motor or motor, along the drive shaft, which serves as eccentric shaft. The pump element with the greatest delivery is situated closest to the motor, where it is supported especially stably by the motor. This is advantageous since the pump element with the greatest delivery is the largest and/or heaviest pump element. During the movement of the pump piston, therefore, the greatest lateral forces, which are particularly well braced by the positioning according to the disclosure, are exerted on the drive shaft. The pump element with the smallest delivery is arranged on the drive shaft furthest away from the motor and thereby exerts the lowest lateral forces on the drive shaft. Compared to existing hydraulic units, such an arrangement reduces the risk of the drive shaft bending, which ensures reduced component wear and an especially even operation.

A hydraulic unit is moreover preferably created in which the pump elements are arranged on a drive shaft which is unilaterally driven by means of a drive motor and which is supported by a rolling element bearing at its end area remote from the drive motor. The rolling element bearing serves to further reduce the risk of the drive shaft bending, which is particularly advantageous where pump elements of the same size are used.

A hydraulic unit is furthermore created in which three first pump elements are preferably assigned to the first brake circuit and three second pump elements to the second brake circuit. A space-saving multi-piston unit, which moreover ensures an especially even operation, is thereby created using only three pump elements per brake circuit.

The first pump element is preferably arranged on the drive shaft radially opposite the second pump element, so that lateral forces occurring on the drive shaft at any given time at least partially cancel one another out.

The disclosure is correspondingly also directed toward the use of such a hydraulic unit according to the disclosure in a vehicle brake system. As already described, the vibrations on the brake pedal are thereby reduced, which creates a better brake pedal sensation for the driver of the vehicle. Furthermore, with the lower engine speed described the NVH behavior of the vehicle is advantageously reduced. NVH stands for noise, vibration and harshness and describes unwanted oscillations in a vehicle, which are audible as noise or perceivable as vibration.

BRIEF DESCRIPTION OF THE DRAWINGS

Two exemplary embodiments of the solution according to the disclosure are explained in more detail below, with reference to the schematic drawings attached, of which.

DETAILED DESCRIPTION

Figure 1:
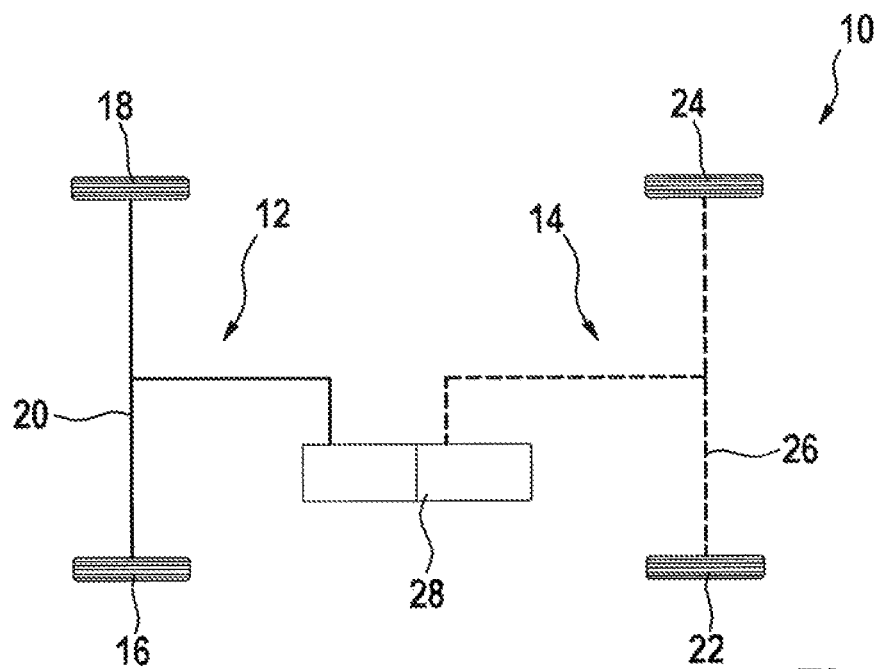
FIG. 1 shows a highly simplified diagram of a vehicle brake system according to the prior art.

FIG. 1 shows a highly simplified diagram of a conventional vehicle brake system 10, which comprises a first brake circuit 12 and a second brake circuit 14. The first brake circuit 12 serves for braking the front wheels 16 and 18 on the front axle 20 and is therefore a front-axle brake circuit. The second brake circuit 14 serves for braking the rear wheels 22 and 24 on the rear axle 26 and is a rear-axle brake circuit. A hydraulic unit 28 serves to provide brake fluid at a regulated brake pressure both in the first brake circuit 12 and in the second brake circuit 14.

For this purpose the hydraulic unit 28 comprises a hydraulic block 30 (FIGS. 2 to 4), in which lines and valves (not represented further) for the first brake circuit 12 and the second brake circuit 14 are arranged. These valves are regulated by means of a control unit 32, which in this case is fitted to a rear side 34 of the hydraulic block 30. A drive motor 38, which in operation drives a drive shaft 40, is fixed to an opposite front side 36 of the hydraulic block 30.

The drive shaft 40 is an eccentric drive for a pump piston (not represented further), which is guided in its reciprocating displacement in a pump cylinder 42. The pump piston and the pump cylinder 42 are integral parts of a single pump element 44, which in an associated bore 46 as associated pump housing is positioned in the hydraulic bock 30.

According to the disclosure the single pump element 44 is a first pump element. Besides the first pump element 44, two further first pump elements 48 and 50 are provided here, together with two associated further bores 52 and 54. These first pump elements 44, 48 and 50 are assigned to the first brake circuit 12. Three second pump elements 52, 54 and 56 are furthermore provided in three bores (not represented further) in the second brake circuit 14. All the pump elements 44, 48, 50, 52, 54 and 56 are arranged on the drive shaft 40 and are operated by the single drive motor 38.

Figure 2:
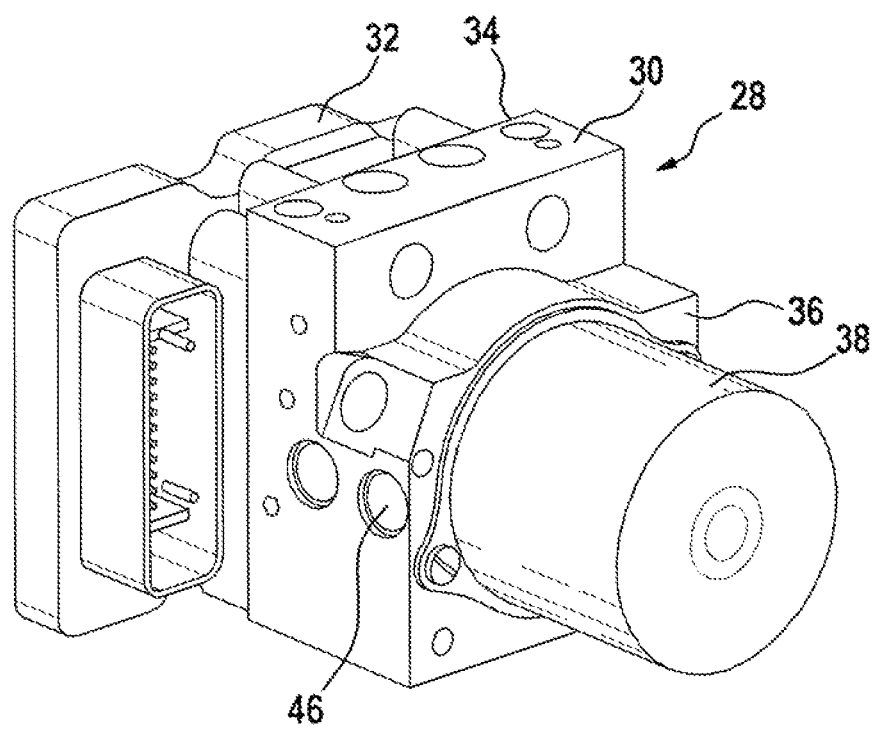
FIG. 2 shows a simplified oblique view of a first exemplary embodiment of a hydraulic unit according to the disclosure.
Figure 3:
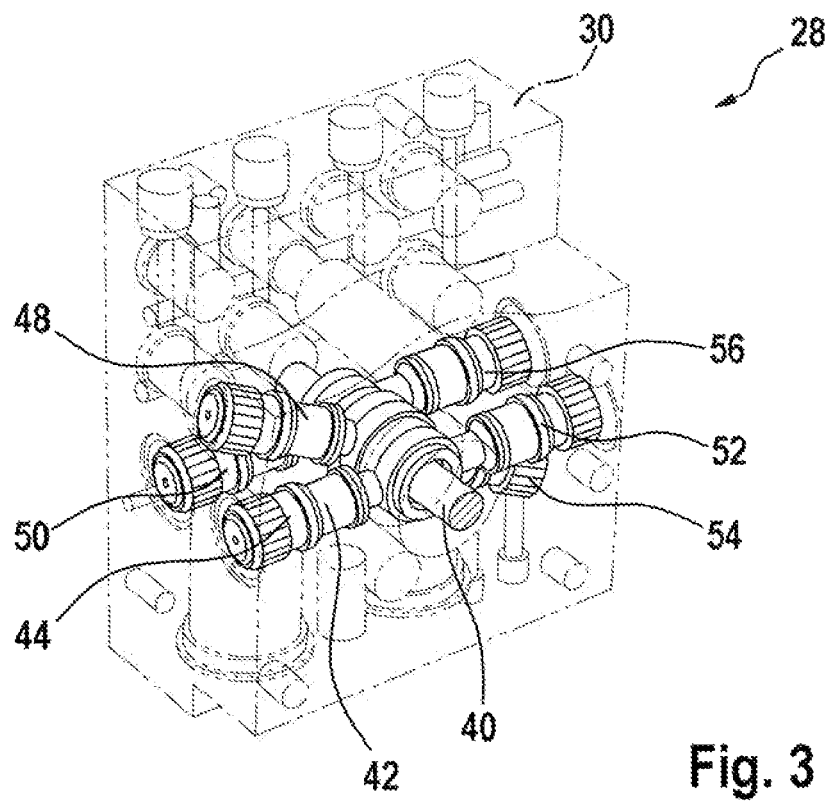
FIG. 3 shows a detailed oblique view of the exemplary embodiment according to FIG. 2.

In the first exemplary embodiment according to FIG. 2 and FIG. 3 the three first pump elements 44, 48 and 50 are of the same size and each have an equal, first delivery. The three second pump elements 52, 54 and 56 are likewise each of the same size and have the same delivery, but have a second delivery different from the first delivery. The required delivery for each brake circuit is thereby spread especially evenly over the pump elements associated with the individual brake circuit.

Figure 4:
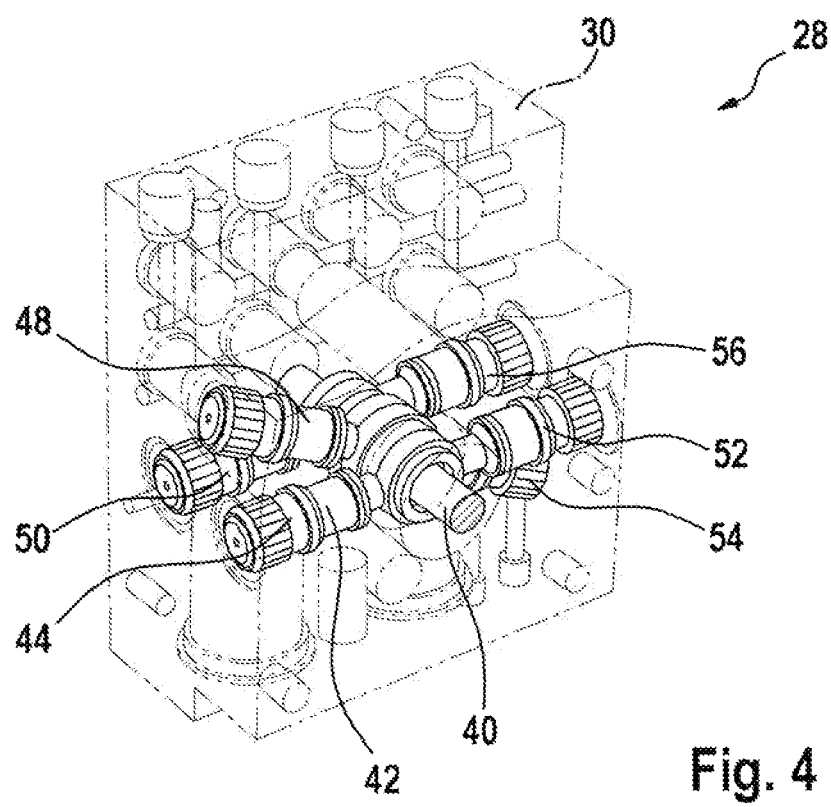
FIG. 4 shows a detailed oblique view of a second exemplary embodiment of a hydraulic unit according to the disclosure.

In the second exemplary embodiment according to FIG. 4 the three first pump elements 44, 48 and 50 differ in size in terms of their delivery. The pump element 44 has the greatest delivery and is fitted to the drive shaft 40 in closest proximity to the drive motor 38. The magnitude of the delivery of the pump elements 44, 48 and 50 diminishes with increasing distance from the drive motor 40. A corresponding arrangement pertains for the three second pump elements 52, 54 and 56, of which the pump element 52 has the greatest delivery and the pump element 56 the smallest delivery. In operation, lateral forces originating from the pump elements 44 and 52 with the greatest deliveries and acting on the drive shaft 40 are greater than the lateral forces exerted by the pump elements 48, 54, 50 and 56 with smaller deliveries. These heaviest lateral forces are braced especially well close to the drive motor 38, because there the drive shaft 40 is able to absorb a higher bending load. With increasing distance from the drive motor 38 in an axial direction, the lateral forces and hence the loads acting on the drive shaft 40 diminish, so that the risk of the drive shaft 40 bending is reduced. Overall, a hydraulic unit 28 is thereby created which is particularly unsusceptible to wear.

In an alternative (not shown) a rolling element bearing, which affords the drive shaft 40 additional support, is fitted to the drive shaft 40 opposite the drive motor 38.

In both exemplary embodiments (FIG. 2 to FIG. 4), according to the disclosure the overall delivery or output of the first pump elements 44, 48 and 50 in the first brake circuit 12 is greater than the overall output of the pump elements 52, 54 and 56 in the second brake circuit 14. As front-axle brake circuit, the first brake circuit 12 with an elasticity of approximately 44 $mm^3$/bar has a greater brake circuit volume than the second brake circuit 14 serving as rear-axle brake circuit, with an elasticity of approximately 30 $mm^3$/bar. Thus the first brake circuit 12 needs a greater volume of brake fluid in the same period than the second brake circuit 14. The output of the respective pump elements adjusted according to the disclosure is particularly advantageous in delivering this difference in volume per unit time to the associated brake circuit. The output of the pump elements matched to the demand on each brake circuit advantageously reduces the speed of the drive motor 38 needed for drive purposes, compared to conventional hydraulic units. This reduced engine speed produces a decisive reduction in the vibration and noise on the associated brake pedal and hence on the vehicle itself. Furthermore, it is also possible to use a less powerful and/or smaller motor and control unit. This takes up less overall space in the vehicle and less energy is needed during operation. Thus more cost-effective current paths can be fitted in the vehicle. Manufacturing cost savings moreover accrue for the correspondingly less powerful components.

What is claimed is:

1. A hydraulic unit of a vehicle brake system comprising:
    at least one first pump element connected to a first brake circuit of the vehicle brake system, the first brake circuit having a first volume; and
    at least one second pump element connected to a second brake circuit of the vehicle brake system, the second brake circuit having a second volume that is different from the first volume;
    the at least one first pump element configured to have a delivery matched to the first volume, and the at least one second pump element configured to have a delivery matched to the second volume, the delivery of the at least one first pump element configured to be different from the delivery of the at least one second pump element such that the hydraulic unit provides brake fluid to both the first brake circuit and the second brake circuit at a common pressure;
    wherein the at least one first pump element and the at least one second pump element are driven by a common drive motor.

2. The hydraulic unit according to claim 1, wherein:
    the first brake circuit, to which the at least one first pump element is connected, includes a front-axle brake circuit,
    the second brake circuit, to which the at least one second pump element is connected, includes a rear-axle brake circuit, and
    the second pump element has a smaller delivery than the first pump element.

3. The hydraulic unit according to claim 1, wherein the at least one first pump element includes a plurality of first pump elements, each having an equal first delivery, and/or the at least one second pump element includes a plurality of second pump elements, each having an equal second delivery.

4. The hydraulic unit according to claim 1, wherein the at least one first pump element includes a plurality of first pump elements having different first deliveries and/or the at least one second pump element includes a plurality of second pump elements having different second deliveries.

5. The hydraulic unit according to claim 4, wherein:
    the pump elements are arranged in series in an axial direction on a drive shaft unilaterally driven by the drive motor,
    one of (i) the at least one first pump element and (ii) the at least one second pump element is positioned closer to the drive motor than the other, and
    the one of the (i) at least one first pump element and (ii) the at least one second pump element that is positioned closer to the drive motor has a greater delivery than the other.

6. The hydraulic unit according to claim 1, wherein the at least one first pump element includes three first pump elements connected to the first brake circuit and the at least one second pump element includes three second pump elements connected to the second brake circuit.

7. A vehicle brake system comprising:
    a hydraulic unit of a vehicle brake system including:
        a first brake circuit that defines a first volume;
        a second brake circuit that defines a second volume different than the first volume;
        at least one first pump element connected to the first brake circuit; and
        at least one second pump element connected to the second brake circuit;
        the at least one first pump element configured to have a delivery matched to the first volume, and the at least one second pump element configured to have a delivery matched to the second volume, such that the hydraulic unit provides brake fluid to both the first brake circuit and the second brake circuit at a common pressure;
        wherein the at least one first pump element and the at least one second pump element are driven by a common drive motor.

8. A hydraulic unit of a vehicle brake system, comprising:
    a drive shaft having a first end configured to be driven by a drive motor;
    a plurality of first pump elements configured to be connected to a first brake circuit of the vehicle brake system, wherein:
        each of the first pump elements has a different delivery; and
        the plurality of first pump elements are arranged axially on the drive shaft in order of delivery, with the first pump element with a largest delivery being arranged closest to the first end of the drive shaft;
    a plurality of second pump element configured to be connected to a second brake circuit of the vehicle brake system, wherein:
        each of the second pump elements has a different delivery;
        the plurality of second pump elements are arranged axially on the drive shaft to at least partially cancel out lateral forces of the plurality of first pump elements acting on the drive shaft, and are arranged in order of delivery, with the second pump element with a largest deliver being arranged closest to the first end of the drive shaft, the drive shaft being configured to unilaterally drive the first and second pluralities of pump elements; and
    the total delivery of the plurality of first pump elements is matched to a first volume of the first brake circuit; and the total delivery of the plurality of second pump element is matched to a second volume of the second brake circuit that is different than the first volume, the total delivery of the plurality of first pump elements configured to be different from the total delivery of the plurality second pump elements such that the hydraulic unit provides brake fluid to both the first brake circuit and the second brake circuit at a common pressure.

* * * * *